United States Patent [19]
Schaller

[11] 3,908,315
[45] Sept. 30, 1975

[54] GRINDING MACHINE SYSTEMS
[75] Inventor: Robert L. Schaller, Baldwinsville, N.Y.
[73] Assignee: Sundstrand Syracuse, Inc., Syracuse, N.Y.
[22] Filed: Oct. 19, 1973
[21] Appl. No.: 407,980

[52] U.S. Cl. ........ 51/103 R; 51/134.5 F; 51/165.71
[51] Int. Cl.² .......................................... B24B 5/22
[58] Field of Search ......... 51/134.5, 103 TF, 103 R, 51/79, 165.71

[56] References Cited
UNITED STATES PATENTS
| | | | |
|---|---|---|---|
| 1,714,246 | 5/1929 | Seibert | 51/79 |
| 3,073,071 | 1/1963 | Dierks | 51/134.5 X |
| 3,182,429 | 5/1965 | Klein | 51/134.5 |
| 3,704,556 | 12/1972 | Nedreski | 51/134.5 R |

FOREIGN PATENTS OR APPLICATIONS
| | | | |
|---|---|---|---|
| 158,508 | 6/1964 | U.S.S.R. | 51/134.5 |

Primary Examiner—Harold D. Whitehead
Attorney, Agent, or Firm—Wegner, Stellman, McCord, Wiles & Wood

[57] ABSTRACT
A grinding machine system which provides infinitely variable speed control of the rotatable wheels in a centerless grinding machine, with the control of such wheels at plural grinding stations to maintain the same surface speed at both stations to prevent application of torque to a workpiece being ground at both stations. The wear of a wheel is detected by a sensor system using pressure coolant fluid and having both a wheel sensing orifice and a control orifice whereby an imbalance in pressures in a pair of cavities associated one with each of such orifices provides an indication of wheel wear. Means responsive to the pressure imbalance returns the sensor orifice to a null position and also advances the wheel to a new position. Incorporated into the wheel-sensing structure for a grinding wheel is a dressing tool which is automatically positioned in dressing position upon movement of the sensing structure to its null position whereby the location of the dressing tool is known at all times. The wheel-sensing mechanism includes a sensor ram housing which is carried on a dresser base and is cam controlled in movement axially of the grinding wheel to have the sensor follow a predetermined contour of the grinding wheel. Additionally, transducers associated with parts of the grinding machine system provide instantaneous readouts of the position of the sensor ram both radially and axially of the grinding wheel.

8 Claims, 8 Drawing Figures

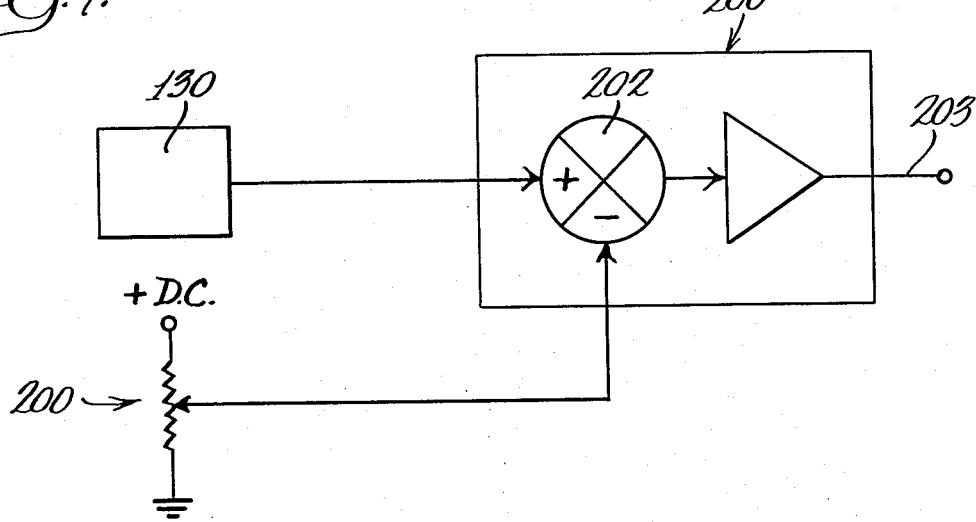
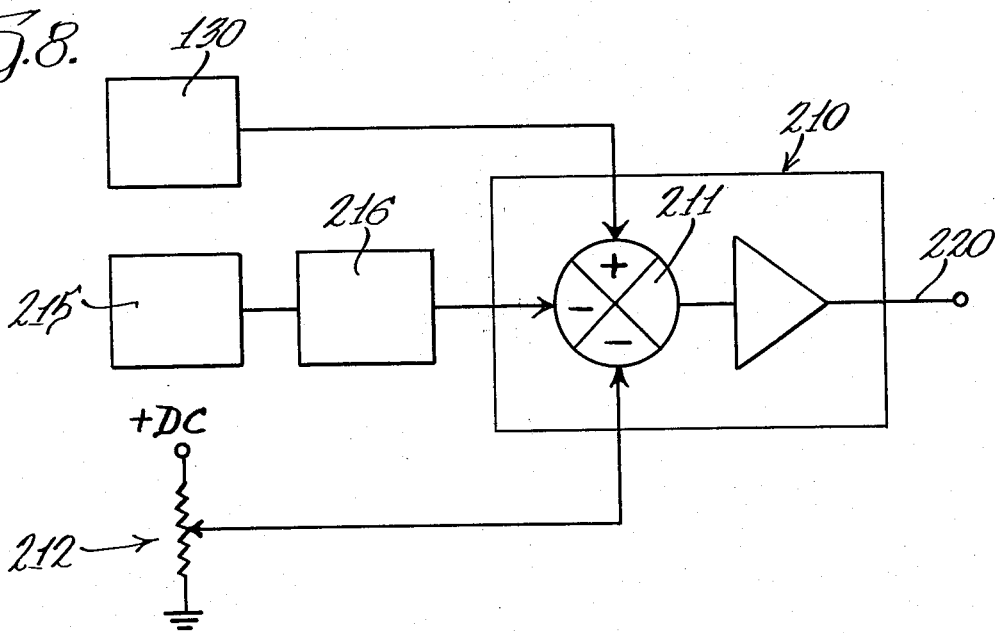

GRINDING MACHINE SYSTEMS

BACKGROUND OF THE INVENTION

This invention pertains to grinding machine systems for controlling the speed of wheels in centerless grinders at a plurality of grinding stations with modification in rotational speed thereof to obtain uniform surface speed to avoid applying torque to a workpiece positioned in at least two of said stations. The invention further pertains to sensor-dresser mechanism in a grinding machine wherein there are no moving parts or parts engageable with the grinding wheel in sensing wear thereof, and wherein the dressing tool is automatically positioned for a redress cycle automatically upon sensing of wear in the grinding wheel and return of the sensing mechanism to a null position.

The prior art includes Stewart et al. U.S. Pat. No. 3,555,742 wherein a wheel wear sensing device is associated with structure for advancing a grinding wheel. This sensing device includes a piston held from engagement with the grinding wheel by fluid pressure. The system disclosed in this patent does not provide a highly accurate control nor one having repeatability and adjustability.

The prior art further includes Behlen U.S. Pat. Nos. 2,968,136 and 2,986,853 showing hydraulic drive systems for a grinding wheel having a variable displacement piston type hydraulic motor with provision for modifying speed of the motor. The speed is modified dependent upon wear of the grinding wheel as accomplished through either positioning of a spark-guard plate in one of the patents or by a probe which contacts surfaces of the grinding wheel in the other patent. These patents do not show a non-contacting, non-moving part sensing device for detecting wear of a wheel.

A number of additional patents found in a search of the prior art show controls for grinding wheel speed with detection of wheel wear in disclosures of certain of the patents. These are the DiLella U.S. Pat. No. 3,134,204, Beohme U.S. Pat. No. 3,156,072, Milias U.S. Pat. No. 3,178,861 and Lonaberger U.S. Pat. No. 3,560,826.

SUMMARY OF THE INVENTION

A feature of the invention disclosed herein is to provide for the control of wheel speed in a centerless grinder to a set reference point, with the set reference point being variable, and further with modification in the rotational speed of the wheel to provide a constant surface speed even with wear on the wheel. The control is applicable to wheels in plural grinding stations to maintain the surface speed of both wheels at the same rate even with variable wear on the two wheels, with the result that the generation of torque in a workpiece being ground in both of the stations is avoided. The foregoing results in maximum efficiency from utilization of multi-station grinders in that a plurality of grinders can be used with the stock removal capability of all of the grinders being constant.

With the foregoing system, the diameter of the grinding wheel may diminish approximately 50% before replacement, and the production capability resulting from said diameter reduction is not decreased because of the speed control providing for constant surface speed of the wheel even though the diameter of the wheel decreases.

An additional feature is in the mechanism for sensing wear of a wheel without the use of moving parts in the sensing element of the use of a system relying upon an imbalance in fluid pressures to provide a signal indicating sufficient wheel wear to compensate in the speed of rotation of the wheel and repositioning of the wheel relative to a workpiece. This fluid pressure balancing system uses the coolant and includes a sensing orifice positioned adjacent the wheel and a control orifice, with said orifices being associated one with each of a pair of matched cavities and with normal pressure balance in both of said cavities. As wheel wear reduces the diameter of the wheel, there is a reduction in fluid pressure in the cavity associated with the sensing orifice which provides a signal to advance the wheel relative to a workpiece, and also to advance the sensing orifice to a new null position. The structure associated with the control orifice may be adjusted whereby the sensitivity of the sensing structure, and particularly the sensing orifice, may be varied.

An additional feature of the invention is to provide for a dressing tool associated with the wheel-sensing structure and carried on a sensing ram whereby return of the sensing orifice to a null position by positioning of the sensor ram automatically brings the dressing tool into a known dressing position ready for redressing.

Additional features of the invention disclosed provide for constant readout of the position of the sensing structure both radially and axially of the grinding wheel, with the variable positioning of the sensing structure under cam control as required for following an irregularly contoured grinding wheel.

BRIEF DESCRIPTION OF THE DRAWINGS

FIG. 7 is a schematic view of a circuit for monitoring the profile of the grinding wheel; and FIG. 8 is a schematic view of a circuit for monitoring the profile of the grinding wheel with respect to a memory set profile.

DESCRIPTION OF THE PREFERRED EMBODIMENT

Figure 1:
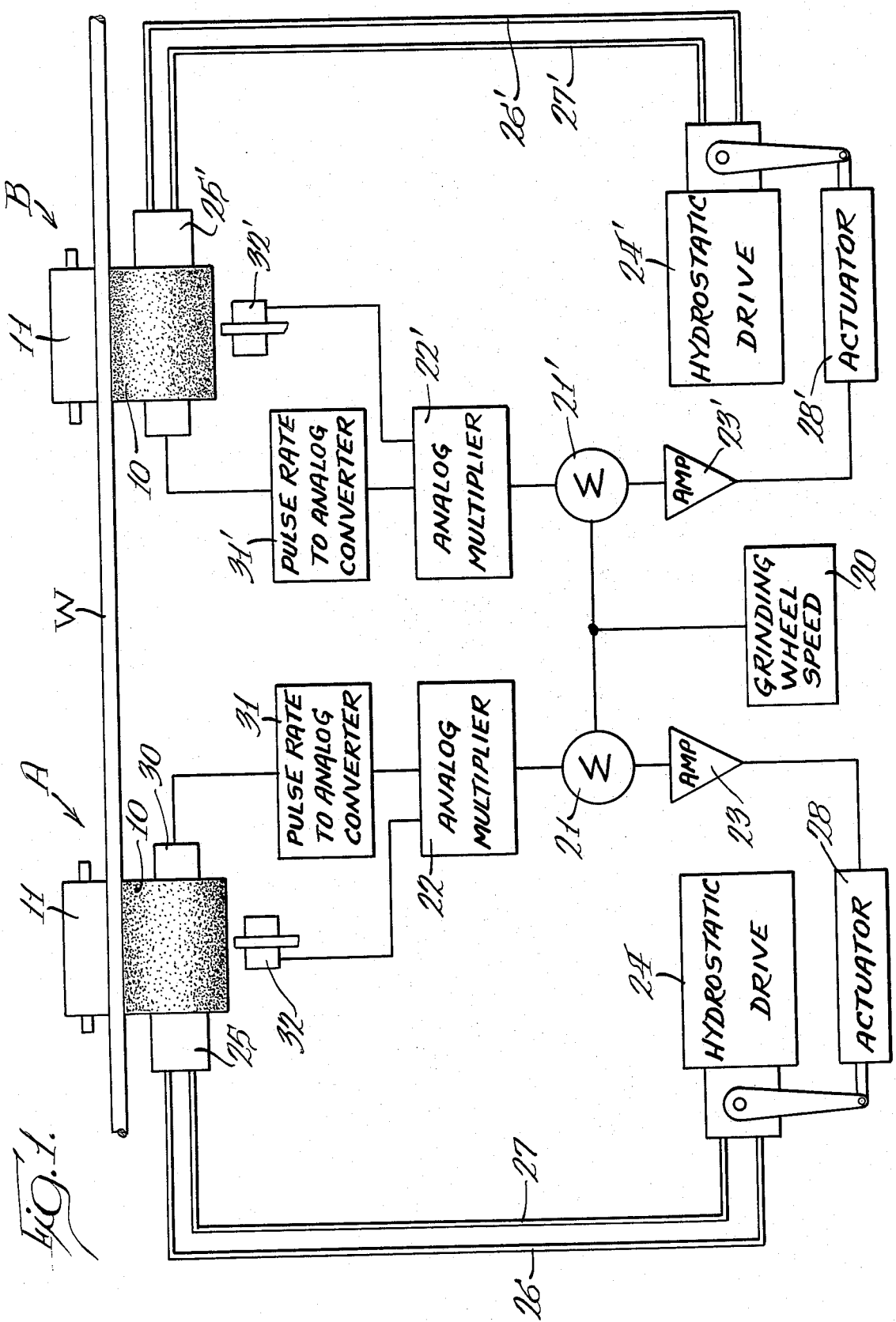
FIG. 1 is a schematic view of a wheel wear-sensing and speed control system for wheels of a plural station centerless grinding machine.

In FIG. 1, a pair of grinding stations are indicated generally at A and B. Each has a centerless grinding structure shown particularly in FIG. 2. This structure includes a grinding wheel 10 and a regulating wheel 11 with a through-feed work support 12 (FIG. 2) coacting therewith for support of a workpiece W such as a bar which, as shown in FIG. 1, is in engagement with the grinding wheels 10 in both of the stations A and B.

Referring particularly to the two grinding wheels 10, the speed control and drive therefor embody the same structure for each, and similar structure would also be used for the regulating wheels 11. The speed of the grinding wheels 10 is set by a control unit 20 which may be either a manually set unit or a computer control unit. This unit outputs an analog signal to a summing unit 21. The summing unit 21 also receives a surface velocity analog for the grinding wheel 10 from an analog multiplier 22 and sums this with the signal from the control unit 20 and provides an output signal which is amplified by an amplifier 23. The grinding wheel 10 is driven by a variable speed hydrostatic drive including a pump 24 and a motor 25 connected by lines 26 and 27 with the output of the pump 24 being variable and controllable by an acutator 28, as known in the art.

The surface velocity analog for the grinding wheel 10 is derived, in part, from a detector 30 which detects the rotational speed of the grinding wheel 10 such as by use of a rotary pulse generator which produces a pulse output that drives a pulse rate to analog converter unit 31. The size of the grinding wheel is detected by a wear-sensing mechanism 32, which is described in more detail subsequently. The wear-sensing mechanism 32 provides an analog output signal indicative of wheel size, which is fed to the analog multiplier 22 along with the analog output from the converter unit 31 which multiplies the wheel size analog by the rotational velocity analog to obtain an output from the analog multiplier 22 which represents the surface speed of the grinding wheel 10. The summing unit 21 produces an error signal when the speed set by unit 20 does not correspond to the surface speed of the grinding wheel to cause the actuator 28 to correspondingly modify pump 24 of the hydrostatic drive. The control unit 20 for setting grinding wheel speed can handle a wide range of speed settings dependent upon the characteristics of the grinding wheel and the material being ground. With the control system providing for constant surface speed or velocity of the grinding wheel 10, it is possible to maintain full production capability of the grinding wheel. As wear of the wheel reduces the diameter thereof, the rotational speed of the wheel is increased.

The control system further provides for corresponding control of the grinding wheel 10 at grinding station B by control structure the same as provided for the grinding wheel 10 in grinding station A. This structure has been given the same reference numeral as that associated with the grinding wheel in grinding station A and with a prime affixed thereto. The summing unit 21' receives the same speed analog from the control unit 20 as that received by the summing unit 21 and the wear of the wheel 10 in grinding station B is sensed in the same manner, with modification in the control of the hydrostatic drive whereby the surface speed of the grinding wheel is maintained constant both as to the setting by the control unit 20 and also with respect to the grinding wheel 10 in grinding station A. This avoids having different surface speeds on the grinding wheels 10 in two stations, and thus avoids generating of torque in a bar. When a bar is relatively small, the application of torque thereto could actually make the bar between the grinding wheels 10 into a spring.

Figure 6:
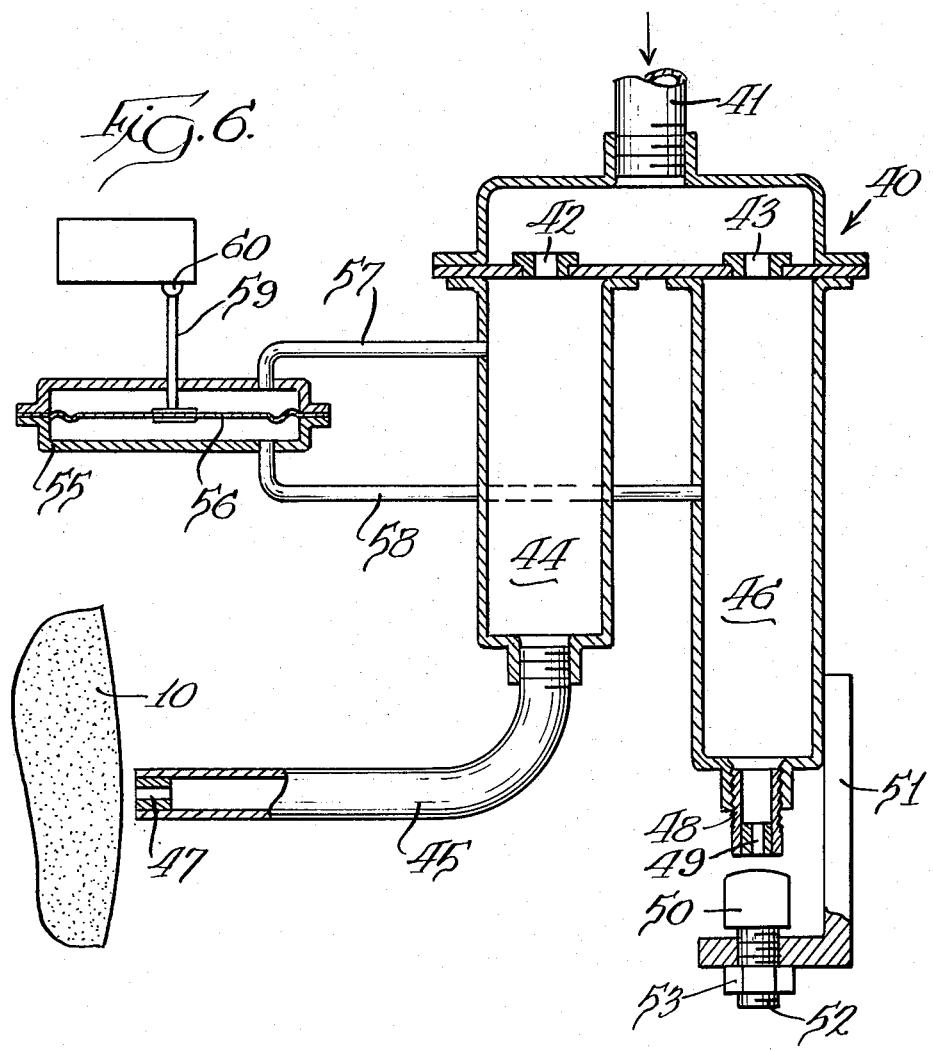
FIG. 6 is a diagrammatic sectional view of the fluid sensing system for detecting wheel wear as shown in FIGS. 2, 3 and 4.

The sensing mechanism for sensing wheel wear and, therefore, diameter of the grinding wheel is shown diagrammatically in FIG. 6. This sensing system ulitizes pressure fluid and, more particularly, the filtered coolant used in grinding. The filtered collant enters a housing, indicated generally at 40, through a pipe 41 and passes through a pair of orifices 42 and 43 leading to a pair of cavities. The orifice 42 leads to a cavity chamber 44 in the housing 40 which has an outlet communicating with a tube 45 and with the chamber 44 and tube 45 having a volume equal to a second cavity chamber 46 in the housing 40 which is supplied with fluid under pressure through the orifice 43. The chamber 46 has the same volume as chamber 44 and tube 45 in total. The end of the tube 45 has in insert 47 providing a sensing orifice which is positioned adjacent the surface of the grinding wheel 10 and through which collant flows. An outlet 48 from the chamber 46 has an insert 49 with a control orifice through which coolant flows and which is positioned adjacent an adjustable restrictor 50 having an upper contour generally corresponding to that of the grinding wheel 10. The restrictor 50 is supported by means of a bracket 51 secured to the housing 40 and is mounted on a threaded member 52 threaded into an opening in the bracket 51 and held in position by a nut 53.

It has been determined that with the proper orifices 42 and 43 in the housing 40 and cavity volumes that a predetermined distance of approximately .010 of an inch of the control orifice from the grinding wheel enables detection of an extremely small increment of abrasive wear because of a differential pressure between the cavities in the housing 40. This sensitivity may be varied by adjusting the distance of the restrictor 50 from the control orifice. Both orifices need not be of the same size. The setting of the distance of the restrictor 50 from the control orifice determines the setting of the sensing orifice distance from the grinding wheel 10. The extremely small change in distance of the grinding wheel surface from the sensing orifice resulting from grinding wheel wear provides a pressure drop of less than 1 p.s.i. whereby a pressure transducer may detect this pressure drop. This pressure drop is detected by a pressure transducer 55 (FIG. 6) having a diaphragm 56 subjected to pressures in cavity chambers 44 and 46 through a pair of conduits 57 and 58, respectively. The diaphragm 56 has an actuating element 59 for operating a control switch 60 when the pressure drop is sufficient to flex the diaphragm and cause the necessary amount of movement of the actuating pin 59.

Figure 2:
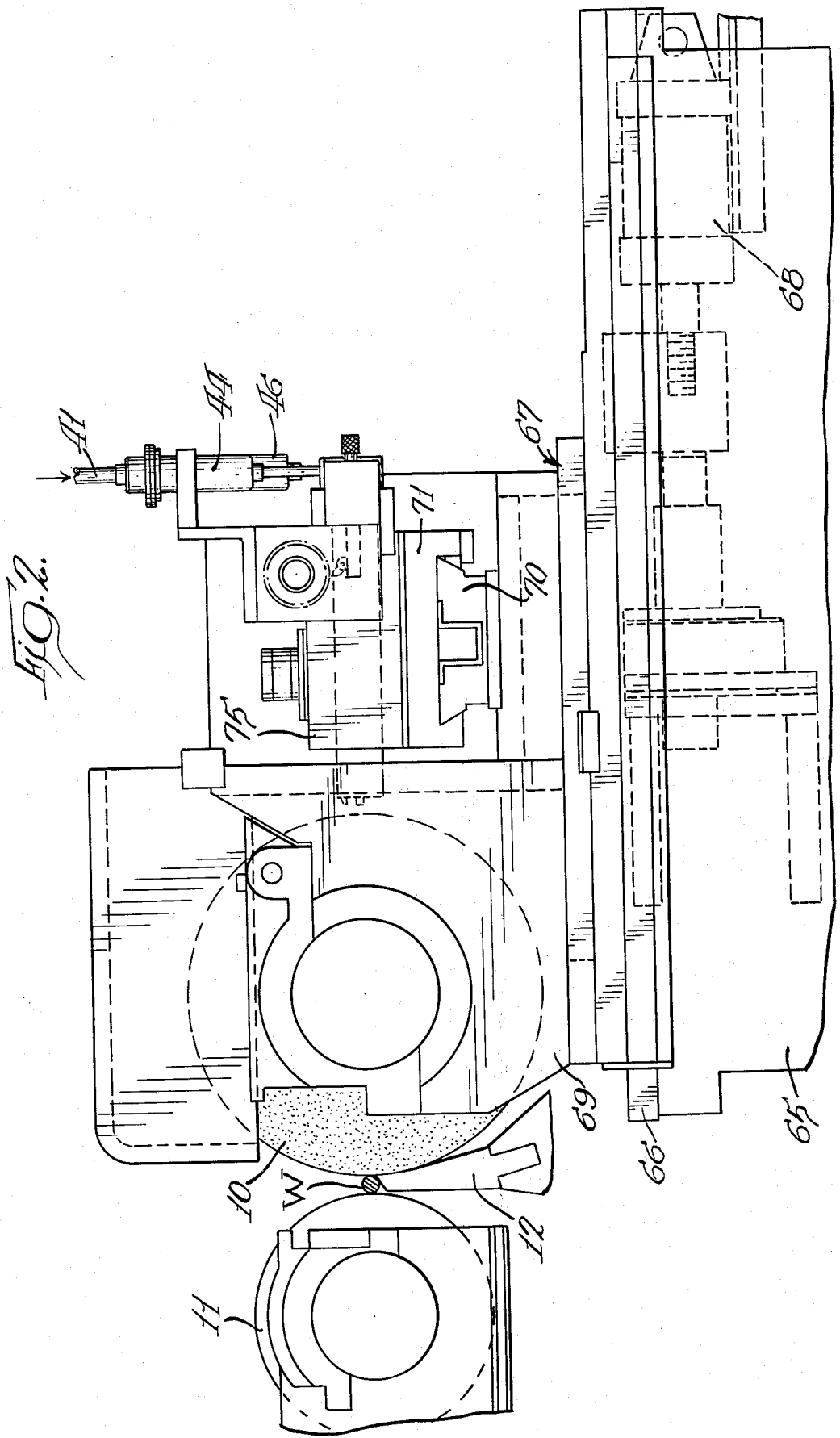
FIG. 2 is a fragmentary end elevational view of a centerless grinding machine embodying the invention.

The general structure of the centerless grinder embodying the invention is shown in FIG. 2, wherein a bed 65 has a way structure 66 mounting a grinding head 67 for movement toward and away from the axis of the workpiece W. The grinding head 67 is moved by a motor 68 in the form of a hydraulic cylinder operatively connected between the bed 65 and the grinding head. The grinding head 67 has a column 69 which rotatably mounts the grinding wheel 10 in a known manner and carries drive means for rotating the grinding wheel 10 and particularly the motor 25 of the hydrostatic drive, as shown in FIG. 1. The grinding head 67 has a way structure 70 extending parallel to the rotational axis of the grinding wheel and mounting a dresser base 71 for movement in a direction parallel to the axis of the grinding wheel 10. The dresser base is moved along the way structure 70 by a cylinder motor 71a.

Figure 4:
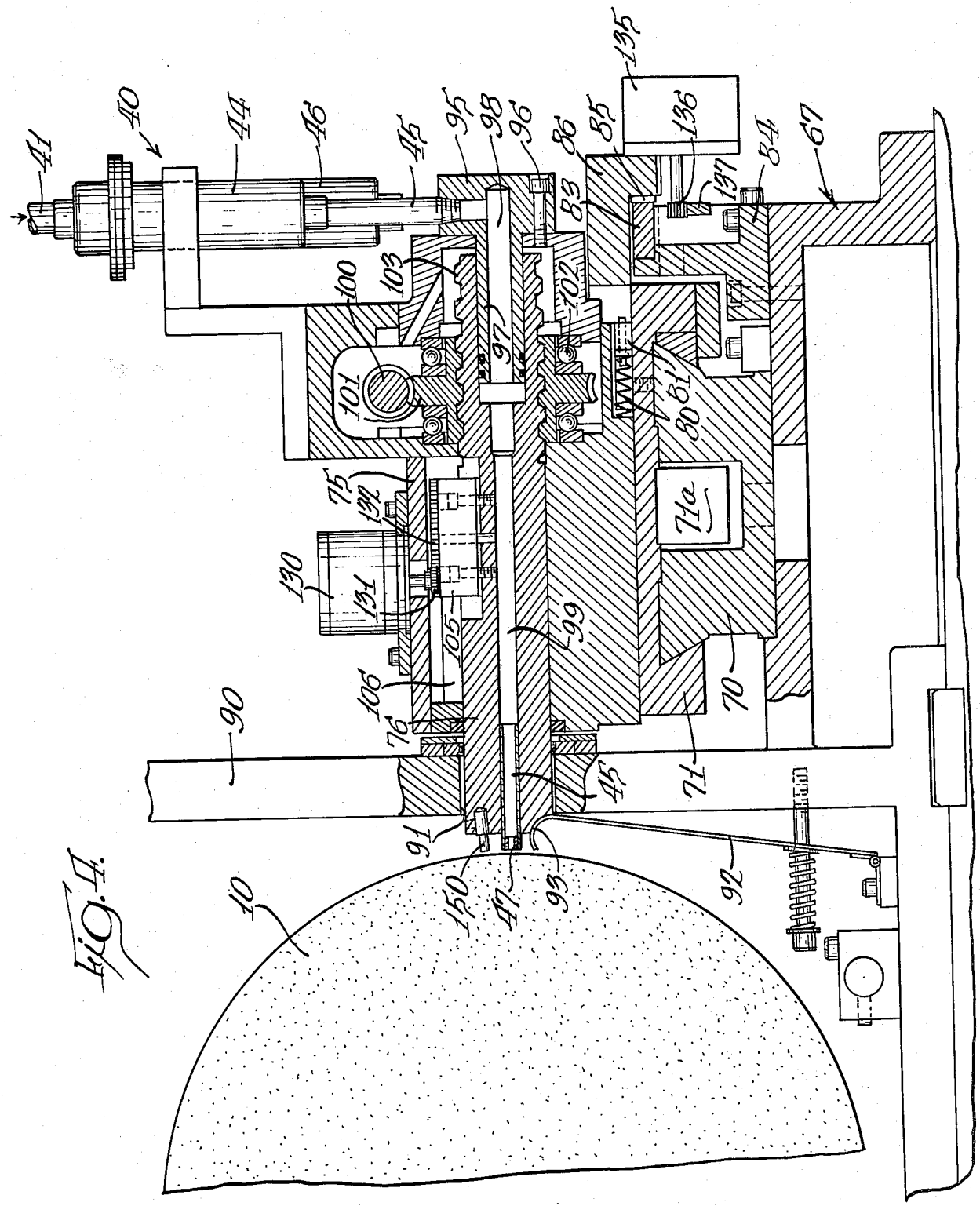
FIG. 4 is a vertical section taken generally along line 4—4 in FIG. 3.

The dresser base 71 has a pair of anti-friction ways 72 and 73, with the latter having a keeper 74 associated therewith, which movably guide a sensor ram housing 75 for movement toward and away from the grinding wheel 10. The sensor ram housing 75 movably mounts a sensor ram 76 (FIG. 4) for movement radially of the grinding wheel 10 with an exposed end thereof carrying the orifice plug 47 having the sensing orifice previously described. The sensor ram housing 75 and, therefore, the sensor ram 76 are yieldably urged toward the grinding wheel 10 and along the ways 72 and 73 by spring means 80 acting between an abutment 81 on the dresser base and an abutment on the sensor ram housing. The position of the sensor ram housing is controlled by an elongate cam bar 83 adjustably mounted to the grinding head by a supporting bracket 84 adjustably mounted to the grinding head. The cam bar 83 coacts with a stylus pad 85 carried by a stylus holder 86 extending outwardly from the sensor ram housing 75. The dresser base 71 is moved along the way structure 70 by the selectively operated power means 71a, and the sensor ram housing 75 is positioned relative to the grinding wheel 10 under the control of the cam bar 83 which has a cam surface corresponding to the axially extending contour of the grinding wheel 10.

The grinder head 67 has a vertically extending wall 90 positioned between the grinding wheel 10 and the dresser base 71 with an elongate opening 91 extending lengthwise thereof and parallel to the axis of the grinding wheel 10 to permit extension of the sensor ram 76 therethrough with travel thereof lengthwise of the grinding wheel. The range of movement of the sensor ram 76 in a direction axially of the grinding wheel is indicated by the broken line positions of the sensor ram as indicated by 76' and 76'' in FIG. 3. A yieldably mounted screen 92 for the coolant extends upwardly from the grinding head with a curved end 93 fitted into a correspondingly shaped section in the end of the sensor ram 76.

The wear-sensing system disclosed diagrammatically in FIG. 6 will now be evident in the structure shown in the other figures wherein the coolant passage 45 includes a block 95 secured to the sensor ram housing 75 by attachment means 96 and which has a stem 97 centrally bored to provide a coolant passage 98 leading to a passage 99 in the sensor ram 76. An end of the sensor ram 76 telescopes onto the stem 97 with suitable O-ring seals therebetween to provide a fluid-tight slidable connection therebetween.

As stated previously, the position of the sensor ram housing 75 as well as the sensor ram 76 relative to the grinding wheel is controlled by the cam bar 83. Additionally, sensor ram 76 is mounted for movement relative to the sensor ram housing 75 as caused by means including a worm gear 100 coacting with a worm wheel 101. The worm wheel 101 is rotatably mounted in the sensor ram housing 75 by bearings 102 and has a spirally threaded internal bore which engages with a matching thread 103 on the exterior of the sensor ram 76, whereby rotation of the worm wheel 101 results in linear movement of the sensor ram 76. This movement is accomplished by restraint of the sensor ram 76 against rotation by means of a key 105 secured to the sensor ram 76 and fitted in a keyway 106 in the sensor ram housing 75.

Figure 5:
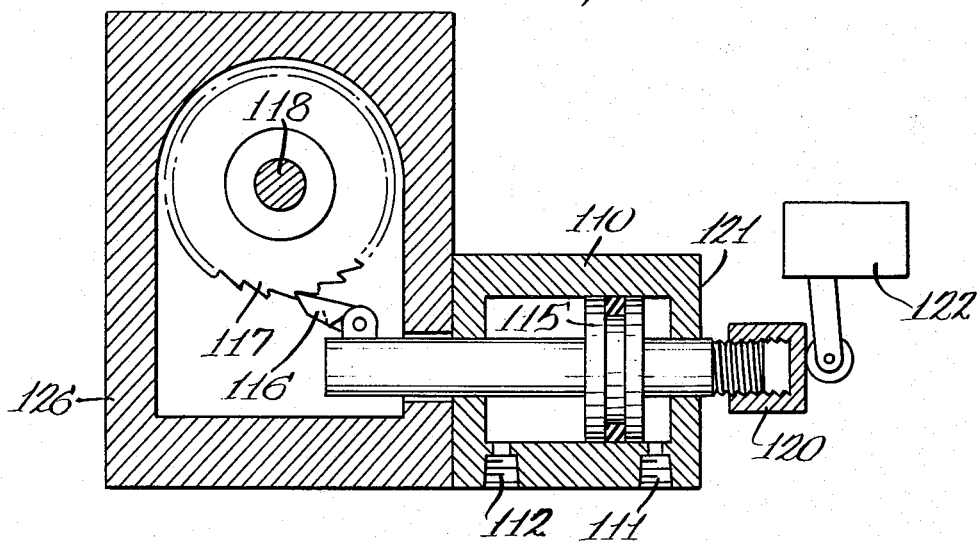
FIG. 5 is a vertical section on an enlarged scale taken generally along line 5—5 in FIG. 3.

When the wear-sensing system shown in FIG. 6 detects a set amount of wear requiring an adjustment of the grinding wheel 10 relative to the workpiece W, the actuation of the switch 60 results in operation of a fluid circuit having a fluid motor 110 (FIG. 5). The fluid motor has a fluid inlet 111 and a fluid outlet 112 for directing pressure fluid to one side or the other of a piston 115 in the motor cylinder, with the piston rod carrying a pawl 116 of a pick-feed mechanism which coacts with a ratchet 117 fixed to a shaft 118 extending from and fixed to the worm gear 100. The pawl 116 is conventionally spring-urged into engagement with the ratchet wheel 117 whereby upon advance of the piston 115 the ratchet wheel 117 is caused to index and rotate the worm gear 100 which resultingly advances the sensor ram 76 to a new null position. The throw of the pick-feed mechanism can be adjusted by adjusting the threaded knob 120 which coacts with an end wall 121 of the motor cylinder. An adjustably mounted limit switch 122 is positioned with its operating element to be engaged by the knob 120 when the pickfeed returns to its retracted position to indicate such a condition and with this switch being interlocked with the control (not shown) for a reversible air motor 125 (FIG. 3) connected to an opposite end of the shaft 118 which has the worm wheel 100 secured thereto. Operation of the air motor 125 results in advance and retraction of the sensor ram 76 by linear movement of the worm gear 100 for rough positioning thereof while the pickfeed mechanism results in fine advance of the sensor ram 76 by rotation of the worm gear 100. The pickfeed mechanism shown in FIG. 5 includes a housing 126 which is attached to the sensor fam housing 75. The sensor ram 76 can also be adjusted by rotation of a knob 127 on shaft 118.

Figure 3:
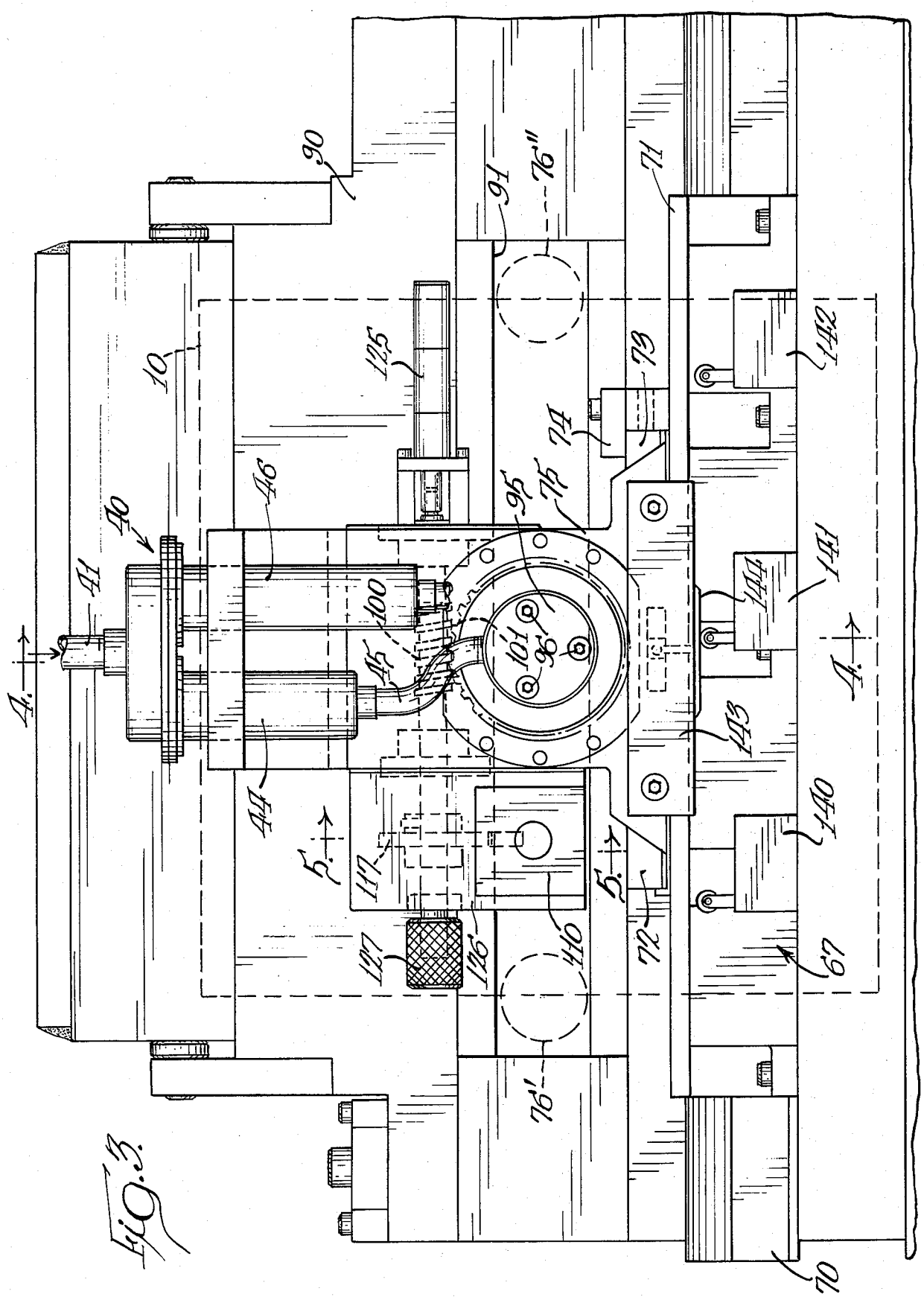
FIG. 3 is an elevational view looking toward the right-hand end of FIG. 2.

A function of the mechanism disclosed herein is the ability to read the profile of the grinding wheel 10 and determine whether a redress cycle is necessary. As part of this operation, the position of the sensor ram 76 is known at all times by use of a transducer unit 130 (FIG. 4) on the sensor ram housing having an input shaft with a gear 131 coacting with a rack 132 associated with the key 105 on the sensor ram whereby positioning of the sensor ram relative to the sensor ram housing 75 is constantly readout by the transducer 130. Additionally, the position of the sensor ram 76 longitudinally of the grinding wheel 10 may be constantly readout by a transducer unit 135 (FIG. 4) having an input shaft with a gear 136 which coacts with a gear rack 137. The transducer unit 135 is carried by the sensor ram housing 76 and the gear rack 137 is secured to the dresser base. The locations axially of the grinding wheel wherein readout is desired may be computer determined from the information obtained by the axial readout transducer unit 135. Alternatively, the "read" or "no read" determination may be made by a plurality of preset swtiches and a controlling cam element. This structure is shown in FIG. 3, wherein a series of spaced swtiches 140, 141 and 142 have their actuators located in the path of a cam bar 143 having an actuating surface 144. The switches 140–142 are mounted on the grinding head 67 while the cam bar 143 is mounted to the dresser base 71.

An additional feature of the invention is the association of a dressing tool 150 such as a diamond with the wear-sensing structure. As shown particularly in FIG. 4, the dressing tool 150 extends outwardly from the sensor ram 76 adjacent the sensing orifice. This dressing tool is slightly offset in a direction peripherally of the grinding wheel 10 and is set at a predetermined distance ahead of the sensing orifice. The dressing tool projects further outwardly from the sensor ram 76. The dressing tool is effectively closer to the surface of the grinding wheel than the sensing orifice. With this relation between the dressing tool 150 and the sensing orifice, the sensing orifice is in appropriate position to sense wheel wear immediately after a dress cycle for the grinding wheel. The dressing tool 150 at all times is in a known position because of its mounting on the sensor ram 76 and with the transducer readout of the sensor ram.

In the system disclosed herein, wear is sensed by the use of coolant which passes through both a control orifice and a sensing orifice. With the selection of proper orifice sizes and sizes of the cavities associated with housing 40, it is possible to have the sensing orifice set at a certain distance from the grinding wheel, and after an extremely small increment of abrasive wear of the wheel, a differential pressure will be created sufficient to operate the switch 60 which actuates the pick-feed mechanism (FIG. 5) to cause an advance of the sensor ram 76 to return the sensing orifice to a null position. At the same time, the pulse derived from operation of switch 60 oeprates through suitable circuitry to operate the cylinder motor 68 and correspondingly advance the grinding head 67 the same amount to return the surface of the grinding wheel 10 to the same effective operating position. The sensitivity of the wear-sensing system can be adjusted by adjustment of the restrictor 50 as previously stated.

The wear-sensing system, including the sensing orifice 47, thus provides a wheel size sensing unit 32 as described in connection with FIG. 1 in controlling the speed of the grinding wheel 10.

With the system disclosed herein, an extremely small amount of wear may be sensed by a sensing system having no moving or wheel-contacting parts and which can provide small position adjustments of the grinding wheel to maintain part size within desired tolerances.

The contour of the grinding wheel 10 can be monitored by utilization of the cam bar 83 and the transducer unit 130. A circuit for accomplishing this is shown in FIG. 7. As previously described, the contour of the grinding wheel is sensed as the dresser base 71 moves axially of the grinding wheel. Any deviation in profile from that established by the cam bar 83 is sensed through the pressure transducer 55 because of the variation in the distance between the control orifice and the grinding wheel. When the profile on the cam bar 83 and the grinding wheel are identical, the output of the pressure transducer 55 is constant, since the control orifice does not vary in distance from the grinding wheel. When there is a variance in said distance, the output of the pressure transducer 55, as previously described, initiates the operation of the pick-feed mechanism including the pawl 116 to bring about a new system null. This movement is picked up by the transducer unit 130. When the transducer unit 130 is moved beyond a set input, a comparator initiates a dress cycle. As shown in FIG. 7, a set input means, indicated at 200, which may be either manually set or by a computer, delivers an output to a comparator, indicated generally at 201, having a summing unit 202 receiving an input both from the input means 200 and the transducing unit 130. When the signal from the transducing unit 130 exceeds the input from the set input means 200, the signal is delivered to control line 203 to initiate the dress cycle.

A modified circuit is shown in FIG. 8 which provides for monitoring the profile of the grinding wheel without use of the cam bar 83. In FIG. 8, there is a comparator, indicated generally at 210, having a summing unit 211 with three inputs. These inputs are from the transducing unit 130, a set input means 212 of the same type as referred to in the circuit of FIG. 7, and from a control 215 which generates, through a memory unit 216, the master profile radius for the grinding wheel. In this particular control, the air motor 125 functions as a bidirectional servo to adjust the wheel-sensing unit to reach a null from either direction, again through the control obtained by the pressure transducer 55.

The master profile radius input delivered from the memory unit 216 is compared with the input from the transducing unit 130. So long as there is a match between these two inputs, the inputs from transducing unit 130 and memory unit 216 cancel out. If not, there is a finite input at the summing terminal of the comparator 210 and this signal is compared with the input signal from the set input means 212. Subsequent operation of this circuit is the same as described in connection with FIG. 7 with an output from the summing unit 211 to a control line 220 initiating a dress cycle.

I claim:

1. A plural station grinding machine with each station having a grinding wheel, said grinding wheels being positioned for simultaneous operation on a workpiece, first and second means associated one with each grinding wheel for driving the associated grinding wheel at a variable rate of speed, means for determining the actual surface speed of each of said grinding wheels, means for setting the same predetermined surface speed for both of said grinding wheels, and means responsive to both said setting means and said determining means for controlling the first and second driving means independently of each other to have both of said grinding wheels operate with the same surface speed to avoid generating torque in a workpiece which is engaged by both of said grinding wheels.

2. A plural station grinding machine as defined in claim 1 wherein said means for determining surface speed of a grinding wheel includes: means for detecting the speed of rotation of a grinding wheel; means for detecting wheel radius; and means for multiplying the radius and speed of rotation.

3. A plural station grinding machine as defined in claim 1 wherein said grinding wheel driving means includes a hydrostatic transmission having a motor connected to the grinding wheel and a pump communicating with the motor, and means for varying the operation of the pump to vary the speed of the motor and associated grinding wheel.

4. A plural station grinding machine with each station having a centerless grinder including a grinding wheel and a regulating wheel, means associated with at least one of said wheels at each of the stations for driving said one wheel at a variable set rate of speed, means for establishing a common surface speed for said one wheel at each station, means for determining actual surface speed of said one wheel at each of the stations, and means for comparing the actual surface speeds with the established surface speed and for controlling the driving means to have said one wheel at both of said stations operate at the same surface speed to avoid generating torque in a workpiece positioned in both of said stations.

5. A plural station grinding machine with each station having a centerless grinder including a grinding wheel and a regulating wheel, said grinding wheels being positioned for simultaneous operation on a workpiece, a pair of hydrostatic transmissions each having a motor connected to a grinding wheel and a pump communicating with the motor, means for varying the operation of the pumps to vary the speed of the motors and associated grinding wheels, control means for setting the same rate of surface speed for said grinding wheels, and means for determining actual surface speed of each of said grinding wheels including means for detecting speed of rotation and radius of each grinding wheel, said control means including means responsive to said surface speed determining means for varying the operation of a pump as required to maintain the surface speeds of said grinding wheels at the desired rate as the grinding wheels wear.

6. A grinding machine having a centerless grinder including a grindinng wheel and a regulating wheel, a hydrostatic transmission having a motor connected to the grinding wheel and a pump communicating with the motor, means for varying the operation of the pump to vary the speed of the motor and associated grinding wheel, control means for setting the rate of surface speed for said grinding wheel, and means for determining actual surface speed of said grinding wheel including means for detecting speed of rotation and radius of the grinding wheel, said control means including means responsive to said surface speed determining means for varying the operation of the pump as required to maintain the surface speed of said grinding wheel at the desired rate as the grinding wheel wears.

7. A grinding machine having a centerless grinder including a grinding wheel and a regulating wheel, a hydrostatic transmission having a motor connected to the grinding wheel and a pump communicating with the motor, means for varying the operation of the pump to vary the speed of the motor and associated grinding wheel, control means for setting the rate of surface speed for said grinding wheel, and means for determining actual sruface speed of said grinding wheel, said control means including means responsive to said surface speed determining means for varying the operation of the pump as required to maintain the surface speed of said grinding wheel at the desired rate as the grinding wheel wears.

8. A plural station grinding machine with each station having a grinding wheel, said grinding wheels being positioned for simultaneous operation on a workpiece, a pair of hydrostatic transmissions each having a motor connected to a grinding wheel and a pump communicating with the motor, means for varying the operation of the pumps to vary the speed of the motors and associated grinding wheels, control means for setting the same rate of surface speed for said grinding wheels, and means for determining actual surface speed of each of said grinding wheels including means for detecting speed of rotation and radius of each grinding wheel, said control means including means responsive to said surface speed determining means for varying the operation of a pump as required to maintain the surface speeds of said grinding wheels at the desired rate as the grinding wheels wear.

* * * * *